Feb. 27, 1934.  E. A. HESTER  1,948,711
NETWORK DISTRIBUTION SYSTEM
Filed Aug. 25, 1932  2 Sheets-Sheet 1

WITNESSES:

INVENTOR
Edgar A. Hester
BY
ATTORNEY

Feb. 27, 1934.  E. A. HESTER  1,948,711
NETWORK DISTRIBUTION SYSTEM
Filed Aug. 25, 1932  2 Sheets-Sheet 2

WITNESSES:

INVENTOR
Edgar A. Hester
BY
ATTORNEY

Patented Feb. 27, 1934

1,948,711

UNITED STATES PATENT OFFICE 1,948,711

NETWORK DISTRIBUTION SYSTEM

Edgar A. Hester, Pittsburgh, Pa., assignor to Westinghouse Electric & Manufacturing Company, East Pittsburgh, Pa., a corporation of Pennsylvania Application August 25, 1932. Serial No. 630,395

9 Claims. (Cl. 175—294)

The present application is a continuation in part of application Serial No. 276,939, filed May 11, 1928.

The present invention relates to a control and protective arrangement for automatically controlling the actuation of a circuit breaker in an electric system and is more particularly applicable in the control of a network circuit breaker in an alternating-current network system of distribution.

The present commercial control arrangements for network circuit breakers are extremely delicate in design and require a high degree of care in handling and testing in order to ensure accuracy of response. Since the network circuit breakers and their associated control equipment are usually placed in relatively inaccessible positions, such as street manholes, overhead poles or building vaults, the control equipment is relied upon to properly control the automatic actuation of the network circuit breakers.

It is at once apparent that the central station operator must depend upon such control equipment for maintaining uninterrupted service to consumers irrespective of system conditions or applications. In view of the rigid requirements of the control equipment it is obvious that the use of a more rugged and simple design would serve to minimize the troubles now encountered in routine handling, testing and inspecting.

The present design and application trend to insensitive control equipment avoids the necessity of extreme delicacy in design and permits the use of a simple, though effective, design.

It is an object of the present invention, therefore, to provide a control arrangement for a network circuit breaker which shall be cheap, durable and simple in design.

Another object of this invention is to provide control equipment which shall obviate the possibility of "pumping" or successive closing and reopening of a network circuit breaker.

Another object of the present invention is to provide a reliable direct trip control for a network circuit breaker.

A further object of the present invention is to provide a control arrangement for a network circuit breaker which limits the closing and opening ranges for the circuit breaker.

Further objects and advantages will become more readily apparent from the following description of the design and operation of a preferred form of the invention taken in conjunction with the drawings wherein.

Figure 1:
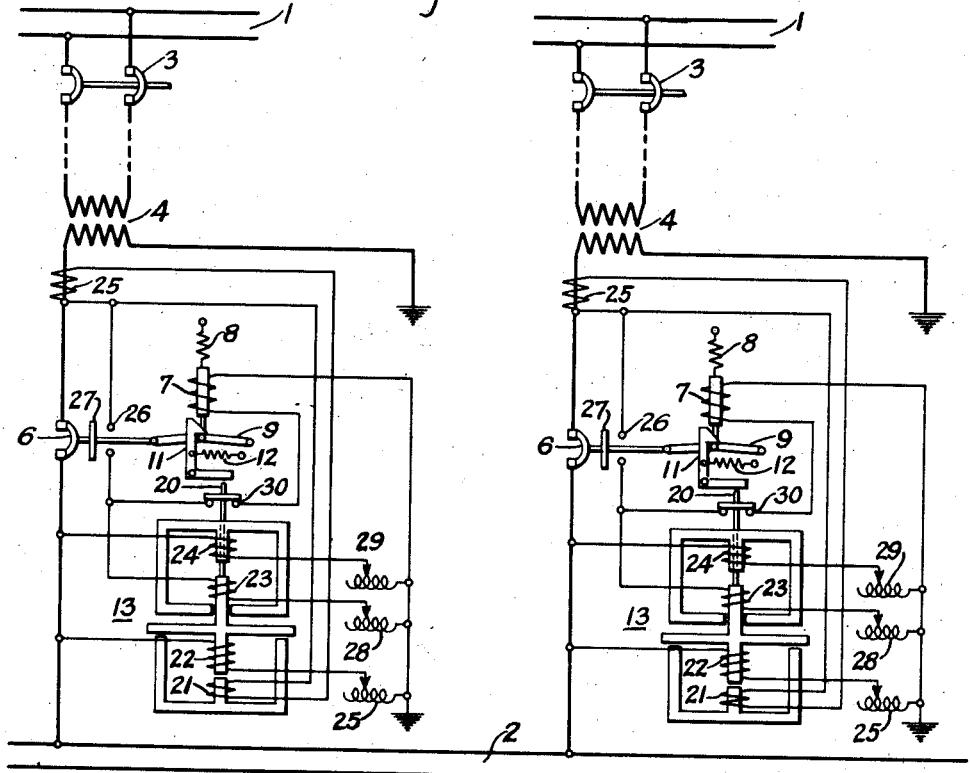
Figure 1 is a diagrammatic representation of an alternating-current network system embodying the control arrangement of the present invention.

Referring more particularly to Fig. 1, an alternating-current network system of distribution comprises a plurality of sources 1 which may be energized from the same or different generating station or power supply and a common network load circuit 2 which is connected to said sources through primary or central station circuit breakers 3, distribution or network transformers 4, and network circuit breakers 6. The network circuit breakers 6 are arranged to automatically connect and disconnect the secondary of their associated network transformer 4 with the network load circuit 2. Any preferred control means may be utilized for effecting the closing and opening of the primary circuit breakers 3 and no control means has been shown since no particular type is required in the practice of the present invention.

Figure 2:
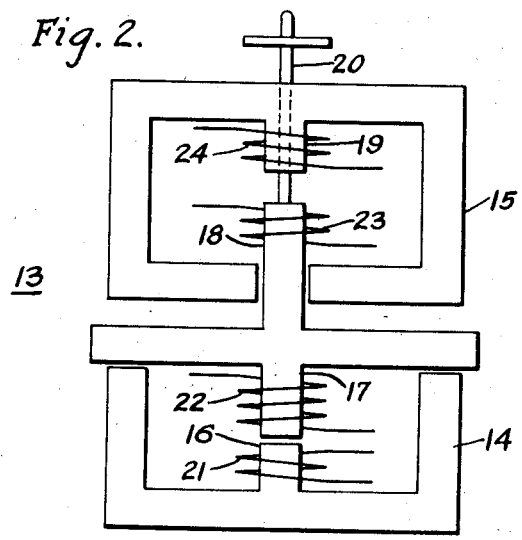
Fig. 2 is a detail view of the tripping and closing mechanism shown in Fig. 1.

However, the control means for the network circuit breakers 6 is shown in detail and functions to close and open the network circuit breakers 6 under predetermined system conditions. Reference is made to Fig. 2 for the detail construction of the initiating element of the network circuit breaker control means.

The network circuit breakers 6 are provided with a closing mechanism including energizing winding 7 and an opening or tripping mechanism including a biasing spring 8, toggle 9 and mechanical latch 11 biased by a restraining spring 12.

A direct trip device 13 comprises magnetic core members 14 and 15 constituting two magnetic-flux paths. The core member 14 is provided with an aligned leg 16 and parallel-extending end portions. A leg 19 is provided on the upper core 15 in vertical alignment with the leg 16 of the lower core 14 and spaced therefrom to provide an air gap therebetween.

In the space between the core portions 14 and 15, a movable armature is provided having vertically extending portions 17 and 18, respectively, cooperating and in alignment with, legs 16 and 19 of the cores 14 and 15; and horizontally-extending portions disposed between the end portions of the cores 14 and 15.

The leg 19 and core 15 are provided with an aperture adapted to receive a vertically movable plunger 20, preferably of non-magnetic material, secured to the portion 18 of the movable armature.

The above described direct trip device is substantially the same as that disclosed in U. S. patent to Smith, No. 1,231,659, issued July 3, 1917, and a more detailed description thereof is accordingly deemed unnecessary.

The plunger 20 is disposed in alignment with the latch 11, whereby, upon vertical movement of the armature, the latch is actuated to release the circuit breaker 6 and effect the opening of the low-voltage circuit.

Movement of the armature and associated plunger 20 is controlled by a plurality of windings 21, 22, 23 and 24 cooperating with the magnetizable legs 16, 17, 18 and 19, respectively.

The terminals of the winding 21 are connected across the secondary winding of a current transformer 25 in the feeder circuit between the network transformer 4 and the network circuit breaker 6. The winding 21 is, therefore, energized in accordance with the magnitude and direction of the current flowing through the network circuit breaker 6.

The winding 22 is electrically connected between the network load circuit side of the network circuit breaker 6 and ground in series with a variable impedance 25. The winding 22 is, therefore, energized in accordance with the network voltage and the variable impedance 25 is provided in order to permit any desired change of the phase angle between the network voltage and the flux produced by the winding 22.

The winding 23 is connected between the network transformer side of the network circuit breaker 6 and ground through back contacts 26 and pallet switch 27 of the circuit breaker 6 and a variable impedance 28. With this circuit arrangement the winding 23 is energized in accordance with the network transformer voltage only when the network circuit breaker 6 is in its open position. The variable impedance 28 is provided for permitting any desired phase angle between the energizing voltage and the flux produced by the winding 23.

The winding 24 is connected between the network load circuit side of the network circuit breaker 6 and ground in series with a variable impedance 29. The winding 24 is thereby energized in accordance with the network voltage and the variable impedance 29 permits any desired phase angle between the energizing voltage and the flux produced by the winding 24.

When the network circuit breaker 6 is in its open position and the network transformer 4 and network load circuit 2 are energized, the windings 22, 23 and 24 are energized. When the network circuit breaker 6 is open, the armature and associated plunger 20 of the device 13 are in the upper or actuated position and the flux produced by the winding 22 tends to pull the armature towards the core member 14 while the flux produced by the winding 24 tends to maintain the armature in its upper position adjacent the core member 15.

The flux produced by the winding 23 normally opposes the flux produced by the winding 24 and when the resultant of the fluxes produced by the windings 23 and 24 bears a predetermined relation to the flux produced by the winding 22, the armature is moved to a position adjacent the core member 14 thereby bridging the contacts 30 associated with the plunger 20 of the device 13.

Upon the bridging of contacts 30, the energizing winding 7, associated with the closing mechanism of circuit breaker 6, is energized from the network transformer side of the network circuit breaker 6, through back contacts 26 and pallet switch 27 of the circuit breaker 6, contacts 30 associated with the plunger 20, energizing winding 7 and thence to ground. The network circuit breaker 6 is thereupon actuated to its closed position against the restraining force of the spring 8 and the mechanical latch 11 cooperates with the toggle mechanism 9 to maintain the breaker in its closed position.

Upon a predetermined reversal of current flow through the network circuit breaker 6, the energizing windings 21, 22 and 24 cooperate to raise the armature and associated plunger 20 to thereby actuate the mechanical latch 11 and permit the spring 8 to open the circuit breaker 6. However, during normal direction of current flow the armature and associated plunger 20 are maintained in the position shown.

Figure 3:
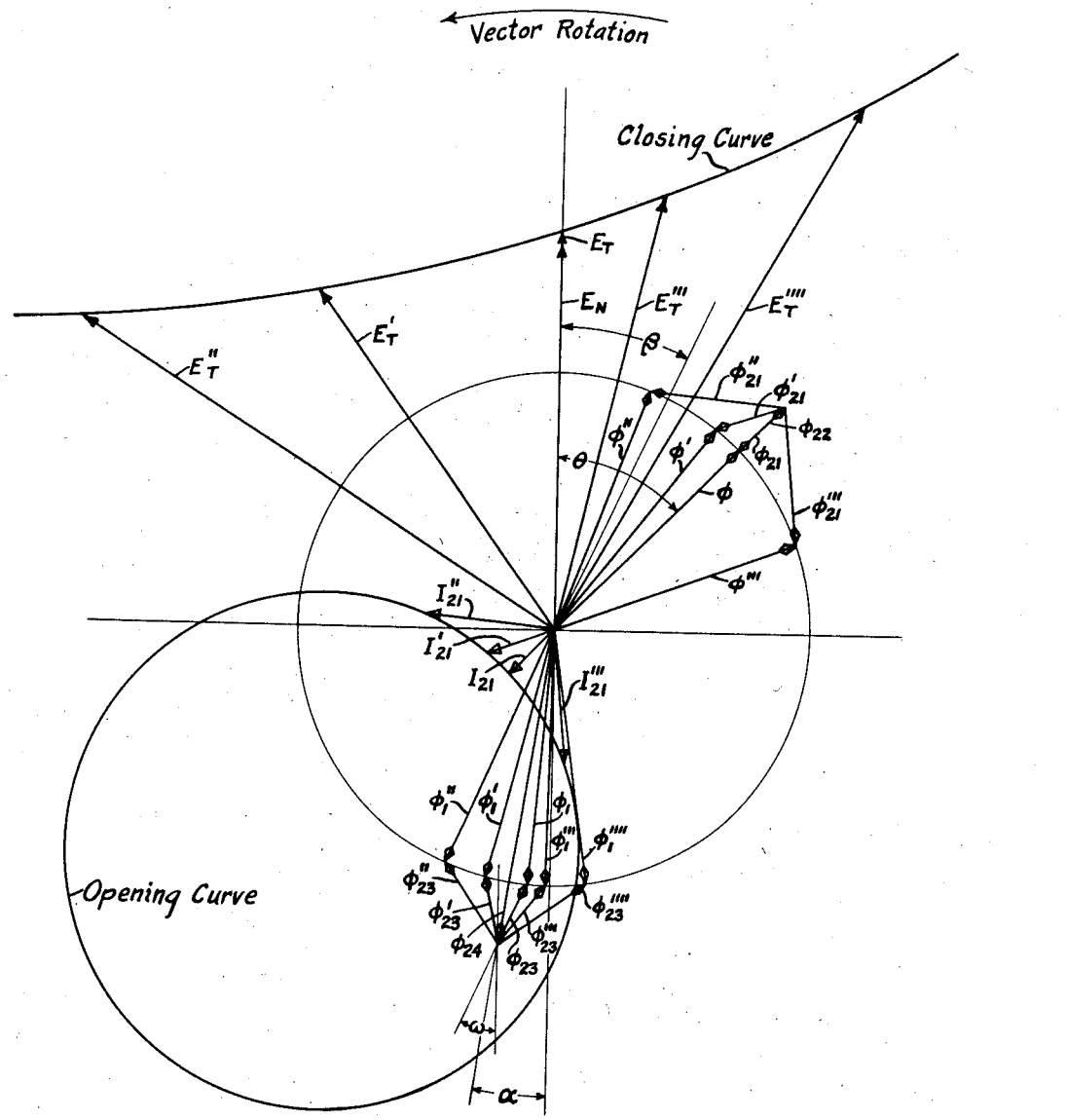
Fig. 3 is a vectorial representation of the closing and opening characteristics of the control arrangement.

In order to better understand the function of the device 13 and the closing and opening characteristics obtainable thereby, reference should be made to the vector analysis of Fig. 3 of the drawings.

In Fig. 3 an assumed network voltage is represented by the vector $E_N$. Since it is highly desirable that the transformer voltage of an incoming feeder circuit should be greater than the network voltage, at least when the transformer voltage is approximately in phase with the network voltage in order to insure power flow from the network transformer to the network load circuit when the network circuit breaker is closed, a minimum in-phase transformer voltage is represented by the vector $E_T$.

Assuming that the flux produced by the winding 24 lags the network voltage by an angle $\alpha$, this flux may be represented by the vector $\phi_{24}$. This flux is tending to maintain the armature and associated plunger 20 in their upper position. The flux produced by the winding 22 is assumed to lag the network voltage by an angle $\theta$ and is represented by the vector $\phi_{22}$. Since these two fluxes act upon the armature substantially independently of their relative phase positions they need not be in phase opposition and the vectors of Fig. 3 may be considered as representing actual energizing conditions.

The flux vectors $\phi_{22}$ and $\phi_{24}$ have been assumed to be of equal magnitude for purposes of explanation and it is further assumed that any resultant flux such as $\phi_1$ will be of just sufficient magnitude to permit the actuation of the armature and resultant closing of the network circuit breaker by the flux $\phi_{22}$.

In order to effect the closing of the network circuit breaker when the network transformer voltage is represented by the vector $E_T$, a proper flux must be produced by the winding 23 opposing the flux $\phi_{24}$ produced by the winding 24. Assuming that the flux produced by the winding 23 lags the energizing transformer voltage by the angle $\omega$, this flux must be equal in magnitude to the vector $\phi_{23}$.

Assuming next that the phase position of the transformer voltage has changed so that the winding 23 produces a flux $\phi'_{23}$, a flux $\phi'_1$ results from the interaction of the several fluxes $\phi_{24}$ and $\phi'_{23}$. Since the flux $\phi'_1$ is equal in magnitude to the flux $\phi_1$, the armature will be actuated, thereby resulting in the closing of the network circuit breaker. The network transformer voltage $E'_T$ resulting in the flux $\phi'_{23}$ leads this flux by the angle $\omega$ and the magnitude of this new transformer voltage bears the same relation to the transformer voltage $E_T$ as the ratio between the fluxes $\phi'_{23}$ and $\phi_{23}$. By construction, the new transformer voltage is represented by the vector $E'_T$.

Similarly, the various transformer voltages, such as represented by the vectors $E''_T$, $E'''_T$ and $E''''_T$, may be determined by assuming the fluxes $\phi''_{23}$, $\phi'''_{23}$ and $\phi''''_{23}$ to be of such magnitude and phase relation that the total resultant flux of the windings 23 and 24 will be represented by the fluxes $\phi''_1$, $\phi'''_1$ and $\phi''''_1$ respectively. In each instance these resultant fluxes must equal the flux $\phi_1$, which has been assumed to be of proper magnitude to effect the closing of the network circuit breaker.

By construction, therefore, it may be seen that the network circuit breaker will only be actuated to its closed position when the transformer voltage vector falls on or above the curve labeled "Closing Curve". It may also be noticed that the closing curve is an arc of a circle having its center on a line rotated from the network voltage vector $E_N$ an angle equal to $\alpha$ or the amount of lag between the flux $\phi_{24}$ and the network voltage $E_N$.

Obviously by changing or varying one or more of the impedances 25, 28 and 29, the closing curve may be flattened or made more concave.

When the network circuit breaker is in its closed position, the windings 21, 22 and 24 are energized. The fluxes produced by the windings 22 and 24 have already been referred to in the vector diagram. Since the flux $\phi_{22}$ is restraining the movement of the armature while the flux $\phi_{24}$ is tending to move the armature toward the upper core member, the winding 21 must produce a flux which opposes the flux $\phi_{22}$ before the flux $\phi_{24}$ can effect the movement of the armature and the resultant opening of the network circuit breaker.

Again, assume a flux $\phi$ to be the maximum resultant flux between the fluxes $\phi_{22}$ and $\phi_{21}$ which will just permit the flux $\phi_{24}$ to actuate the device 13 and open the network circuit breaker. Obviously a directly opposing flux $\phi_{21}$ will reduce the flux $\phi_{22}$ to the resultant flux $\phi$. An in-phase current $I_{21}$ is assumed to be necessary to produce the flux $\phi_{21}$ and for purposes of simplification has been made equal in magnitude to this flux. It follows therefore that a reverse current of the magnitude and phase position of the current $I_{21}$ will just cause the network circuit breaker to be opened.

Assuming a flux $\phi'_{21}$ to be produced by winding 21, a flux $\phi'$ results which is equal in magnitude to the flux $\phi$ and the network circuit breaker will be actuated to its open position and an in-phase current $I'_{21}$ is required to produce the flux $\phi'_{21}$. In like manner the fluxes $\phi''_{21}$ and $\phi'''_{21}$ are produced by currents $I''_{21}$ and $I'''_{21}$, respectively. By construction, it may be noticed that the several currents which define the curve labelled "Opening Curve" fall upon the circumference of a circle whose center lies upon a line through the vector $\phi$ extended.

It follows therefore that any current flowing through the network circuit breaker which falls in substantially the lagging reverse quadrant with respect to the network voltage, will cause the circuit breaker to be opened while any other current will produce a flux in the winding 21 which will cooperate with the flux $\phi_{22}$ to maintain the circuit breaker closed.

It will thus be seen that the present invention restricts both the closing and opening ranges of the network circuit breaker. Since the current which flows through a network circuit breaker after it closes always lags the difference voltage between the transformer and network voltages by an angle approximately equal to the impedance angle of the system, pumping of the network circuit breaker cannot possibly occur.

It is also obvious that the opening range may be limited entirely to the reverse lagging quadrant while the closing curve may be made more convex and further removed from the network voltage vector merely by changing the values of one or more of the impedances 25, 28 and 29.

The present invention has been described with reference to a single phase system; however it is obvious that this invention may be applied to polyphase systems in accordance with the description detailed hereinbefore.

A particular embodiment of the invention has been shown and described but obviously many changes may be made in the structure and circuit arrangement without departing from the scope of the invention.

For example the windings 22 and 23 of the device 13 may be energized in accordance with the transformer voltage and the winding 24 may be energized in accordance with the network voltage. With such connections it may be shown by an analysis, generally similar to the vector analysis of Fig. 3, that proper closing and opening characteristics may be obtained.

I claim as my invention:

1. In an electrical distribution system comprising a distribution circuit and a plurality of transformers for supplying energy to said circuit, the combination with a plurality of circuit interrupters of the latched-closed type for controlling the flow of power through said transformers, of a magnetic tripping device for mechanically tripping each interrupter in response to a predetermined direction and magnitude of current flowing in the transformer associated therewith, and means controlled by said tripping device for reclosing said interrupter when the transformer voltage bears a predetermined relation to the network voltage.

2. In a distribution system comprising a circuit to be protected and a circuit interrupter associated therewith, a directional tripping device for mechanically tripping said interrupter, said device including a movable armature, a voltage winding associated with said armature to move the same into operative position, a second voltage winding disposed to oppose the action of said first winding, and a current winding disposed to control the effectiveness of said second winding in accordance with the direction of current flowing in said circuit.

3. A direct-trip attachment for a circuit interrupter associated with a low-voltage network comprising an armature operable to a tripping position for mechanically tripping said interrupter, a winding energized in accordance with the network voltage for moving said armature into tripping position, two other windings associated with said armature, and means whereby said two other windings have a normally cumulative effect in opposition to said first winding during normal electrical conditions in said network, and effectively neutralize each other upon the occurrence of predetermined abnormal conditions.

4. In an electrical distribution system comprising a distribution circuit and a plurality of transformers for supplying energy to said circuit, a plurality of circuit interrupters to control the connection of the transformers to said distribution circuit, each interrupter being operable to a closed position and having latch mechanism for latching it in closed position, a direct-trip device for each interrupter effective to trip the corresponding latch mechanism under predetermined voltage and current conditions of the associated transformer, each of said devices having cooperating windings responsive to the voltage on the circuit and the current in the associated transformer when the corresponding interrupter is closed, and means controlled by the corresponding trip device for reclosing each of said interrupters when the associated transformer is in energy-delivering condition with respect to said distribution circuit.

5. In an electrical distribution system comprising a load circuit and a plurality of distribution transformers connected thereto through supply circuits, a circuit interrupter in each supply circuit and a direct-trip device for each of said interrupters, each of said devices having means effective to mechanically trip the corresponding interrupter in response to electrical conditions involving current flow in a predetermined direction in the corresponding supply circuit, and means, including the corresponding device, for causing each of said interrupters to close when the transformer and network voltages bear such relation as to cause a current to flow after the interrupter closes which will have a magnitude and phase position such that the interrupter will be maintained closed.

6. In an electrical distribution system comprising a load circuit and a plurality of distribution transformers connected thereto through supply circuits, a circuit interrupter in each supply circuit and a direct-trip device therefor comprising means for tripping said interrupter in accordance with the direction of current flowing in the associated supply circuit and means controlled by said direct-trip device for reclosing said interrupter only when the transformer and network voltages bear such relation as to cause a current to flow after the interrupter closes which will have a magnitude and phase position such that the interrupter will be maintained closed.

7. In automatic switching apparatus for an alternating current circuit, a circuit breaker having an electromagnetic closing element, main contact members biased to open position, and latch mechanism for maintaining said main contact members in closed position against the bias; and a direct-trip device for controlling said circuit breaker, said device having a movable member operable to trip said latch, closing contact members operable to complete an energizing circuit for said closing element, and an electromagnetic element for operating said member in response to a predetermined abnormal condition of said circuit and for operating said closing contact members in response to a predetermined normal voltage condition of said circuit.

8. In a direct-trip attachment for a circuit breaker of the latched-closed type, a movable member operable from an initial position to a tripping position for mechanically tripping the latch of said circuit breaker, and electromagnetic means effective when said movable member is in said initial position for initiating movement thereof in response to predetermined voltage and current conditions and effective when said movable member is in said tripping position for initiating movement thereof in response to predetermined voltage conditions, and contact members operable by said movable member in response to said predetermined voltage conditions.

9. In a direct-trip device for use with a circuit breaker of the latched-closed type, magnetic means including stationary core means forming a first magnetic path having an air gap and a second magnetic path, and a magnetic armature member subject to opposing forces produced by magnetic fluxes in said two paths, said armature being operable from an initial position in which it bridges said gap to a tripping position in which said gap is open; and winding means interlinked with said magnetic means for producing opposing forces acting on said armature member such that the resultant of said forces normally acts to maintain said armature in said initial position, but acts to initiate movement of said armature toward said tripping position in response to a predetermined directional power condition, whereby said armature moves with increasing force to said tripping position in response to said directional power condition.

EDGAR A. HESTER.